United States Patent [19]

Suzuki et al.

[11] Patent Number: 5,397,278
[45] Date of Patent: Mar. 14, 1995

[54] SPROCKET FOR ROLLER CHAIN

[75] Inventors: Tadasu Suzuki, Chicopee, Mass.; Shigekazu Fukuda, Tokorozawa, Japan

[73] Assignee: Tsubakimoto Chain Co., Osaka, Japan

[21] Appl. No.: 267,813

[22] Filed: Jun. 28, 1994

[30] Foreign Application Priority Data

Jun. 30, 1993 [JP] Japan .................. 5-040525

[51] Int. Cl.6 ............................ F16H 7/06
[52] U.S. Cl. .............................. 474/156
[58] Field of Search .......... 474/206, 212–217, 474/152, 155–157

[56] References Cited

U.S. PATENT DOCUMENTS 4,116,081  9/1978  Luttrell et al. .................. 474/156
4,758,209  7/1988  Ledvina .......................... 474/156

*Primary Examiner*—Michael Powell Buiz
*Attorney, Agent, or Firm*—Howson & Howson

[57] ABSTRACT

An improved sprocket for engaging a roller chain has a plurality of teeth and bottom surfaces located between adjacent teeth. Each tooth has a trailing and a leading face, each of which includes a proximal surface adjoining the bottom surface of the sprocket, and a distal surface joining the proximal surface at a meshing point and extending outwardly therefrom. A chain roller is spaced from the proximal surfaces of opposed tooth faces and from the adjoining bottom surface when it is in engagement with the meshing points of these faces. The distal surface of the trailing face of each tooth is in the form of a circular arc centered on a point at which the center of an immediately preceding chain roller is located when in contact with the meshing point on the leading face of the same tooth and the opposing meshing point of the trailing face of the tooth immediately ahead of said same tooth. This configuration deadens the noise produced by collision of the rollers with the sprocket teeth, and decreases the overall noise level of the chain drive system.

1 Claim, 3 Drawing Sheets

SPROCKET FOR ROLLER CHAIN

BRIEF SUMMARY OF THE INVENTION

This invention relates to a sprocket for a roller chain. It is specifically concerned with a sprocket having an improved tooth configuration for reducing noise.

The teeth of a conventional S-type sprocket engage the rollers of a roller chain, the pitch of which is such that the rollers are securely received in succeeding tooth cavities as the sprocket rotates. The bottoms of the tooth cavities conform with the shape of the rollers such that no gap exists therebetween. Noise is generated when the rollers collide with the bottoms of the tooth cavities.

The principal object of this invention is to provide a sprocket which reduces the noise generated when it engages the rollers of a roller chain.

The improved sprocket in accordance with the invention comprises a plurality of teeth and bottom surfaces located between adjacent teeth. Each tooth has a leading face and a trailing face. The trailing face of each tooth is opposite to the leading face of a next adjacent tooth. The trailing and leading faces each have a proximal surface adjoining the bottom surface of the sprocket, and a distal surface joining the proximal surface at a meshing point and extending outwardly therefrom. The meshing points on the opposed tooth faces of each pair of adjacent teeth are spaced from each other by a distance such that a circular, cylindrical chain roller in engagement with both of said meshing points is spaced from the proximal surfaces of said faces and from the adjoining bottom surface. The distal surface of the trailing face of each tooth is in the form of a circular arc centered on a point at which the center of an immediately preceding chain roller is located when in contact with the meshing point on the leading face of the same tooth and the opposing meshing point of the trailing face of the tooth immediately ahead of said same tooth. The radius of curvature of the arc is therefore substantially equal to the pitch of the chain minus one-half of the roller diameter.

DETAILED DESCRIPTION

Figure 3:
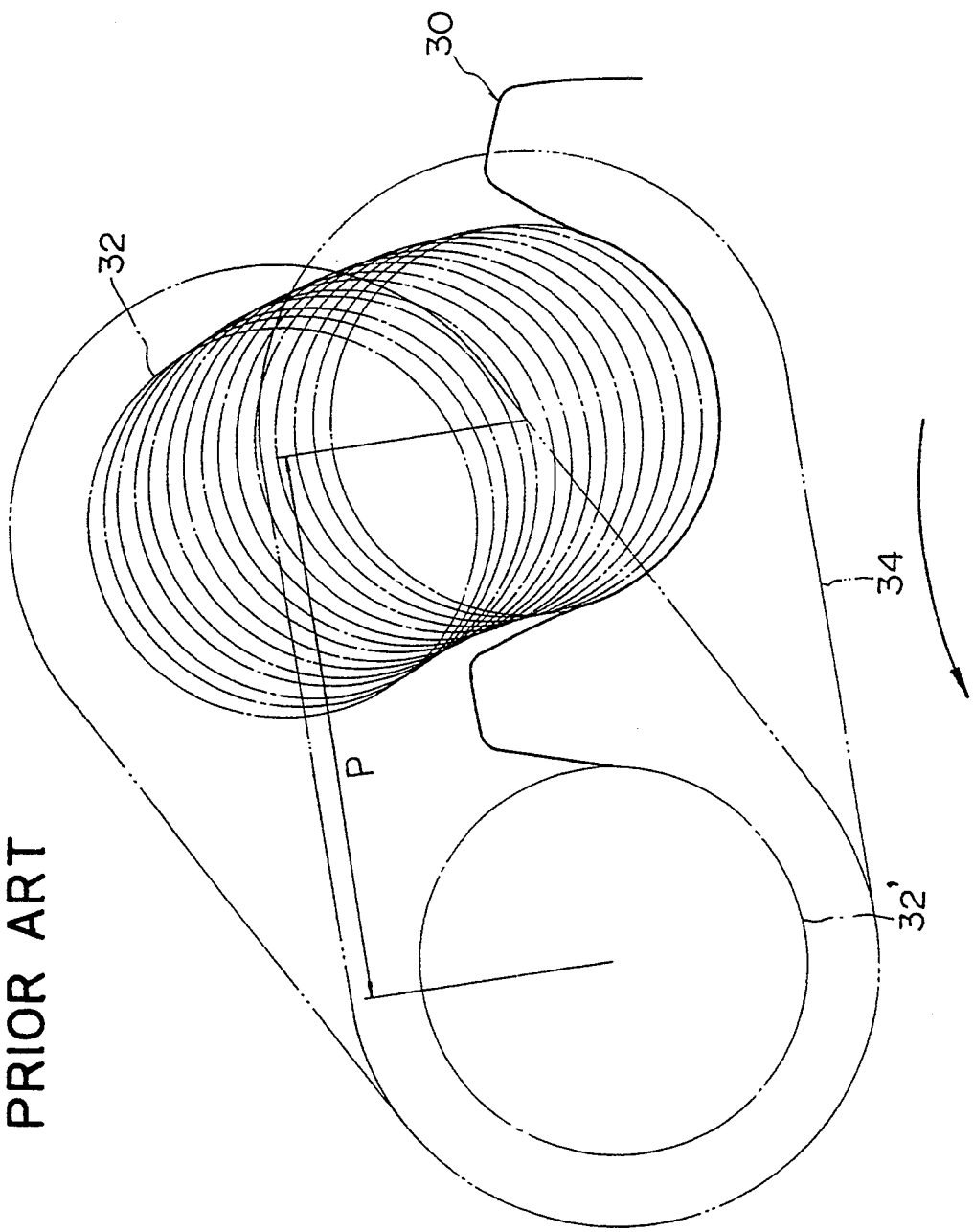
FIG. 3 is a schematic view of a conventional sprocket and roller chain.

A conventional S-type sprocket 30 and roller chain are depicted in FIG. 3. The chain comprises rollers 32 and 32' connected by a link plate 34. The sprocket 30 rotates in a counterclockwise direction. Roller 32 is received in a tooth cavity of the sprocket 30 after the preceding roller 32' has been securely received in the preceding tooth cavity. Roller 32 rotates relative to the center of the preceding roller 32'. The radius of this rotation is equal to the chain pitch P. This allows the rollers to be received in successive tooth cavities. The bottom of the tooth cavities conform with the shape of the rollers 32 and 32' so that no gap exists therebetween. The impact of the rollers with the sprocket creates noise.

Figure 1:
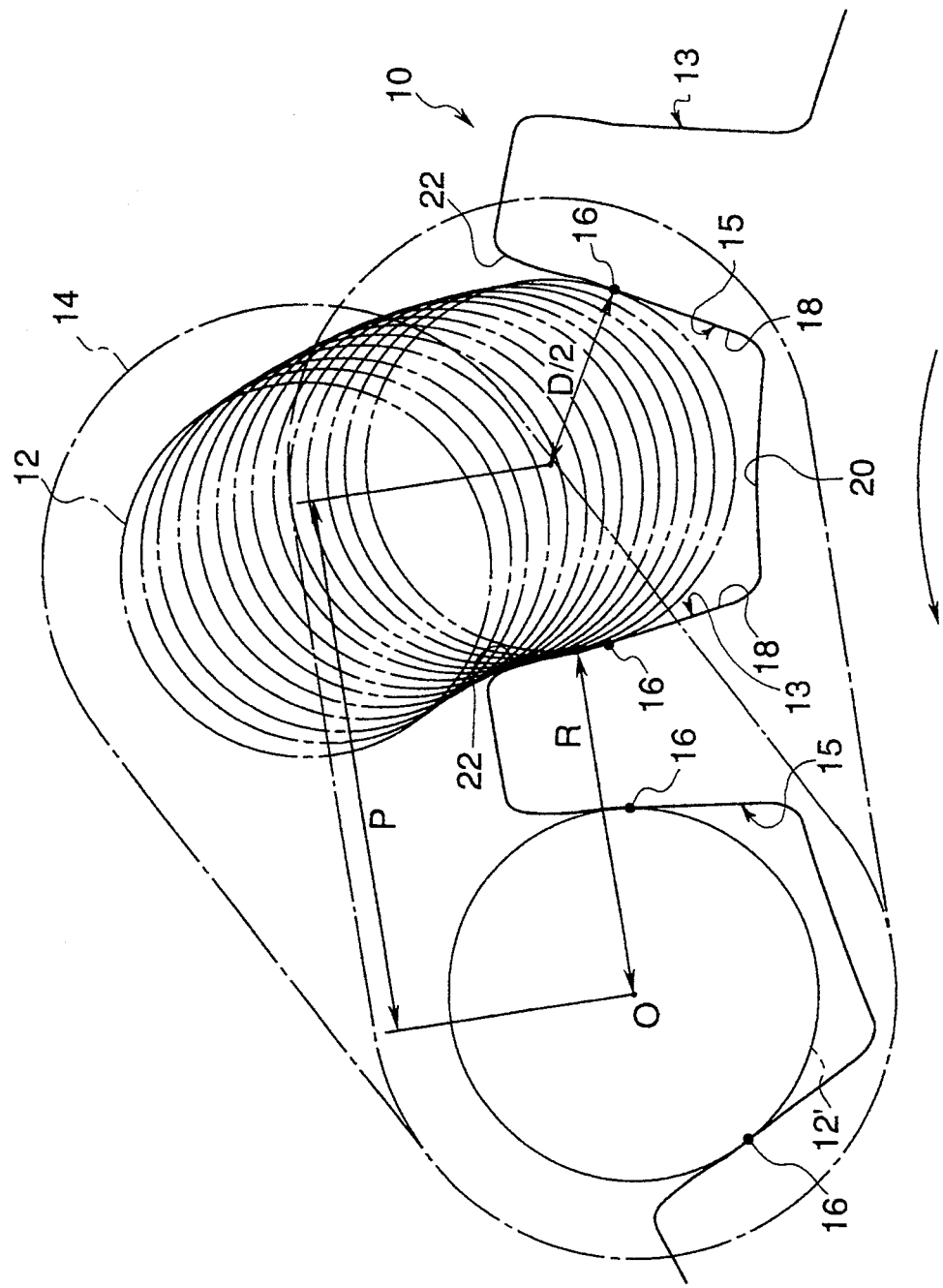
FIG. 1 is a schematic view of the improved sprocket in accordance with the invention and roller chain.

The improved sprocket 10 in accordance with the invention, and its associated roller chain, are shown in FIG. 1. The chain comprises rollers 12 and 12' and a link plate 14. The sprocket 10 comprises a plurality of teeth 11 and bottom surfaces 20 located between adjacent teeth 11. Each tooth 11 of the sprocket 10 has a trailing face 13 and a leading face 15. The trailing face 13 of a preceding tooth 11 is opposite to the leading face 15 of the next adjacent tooth 11.

Each face 13 and 15 has a proximal surface 18, which adjoins a bottom surface 20, and a distal surface 22, which joins the proximal surface 18 at a meshing point 16 and extends outwardly therefrom. The meshing points 16 on opposed tooth faces 13 and 15 of each pair of adjacent teeth 11 are spaced from each other by a distance such that a roller 12, in engagement with both of the meshing points 16, is spaced from the proximal surfaces 18 of the faces 13 and 15 and from the adjoining bottom surface 20. This creates a gap between the roller on the one hand and the proximal and bottom surfaces 18 and 20 on the other.

The motion of the roller 12 is such that the roller comes into contact with the distal tooth surface 22 of the trailing face 13 of tooth 11 and remains tangent to surface 22 through a distance extending from the point of initial contact to the meshing point 16. The distal tooth surface 22 is in the shape of a circular arc centered on a point 0 at which the center of an immediately preceding chain roller 12' is located when in contact with the meshing point 16 on the leading face 15 of the same tooth 11 and the opposing meshing point 16 of the trailing face 13 of the tooth immediately ahead of that tooth 11. Because of the configuration of surface 22 of trailing face 13, the roller 12 contacts, and subsequently slides or rolls along, the distal surface 22 of the trailing face 13 of the tooth 11 until it comes to rest at the meshing points 16.

Figure 2:
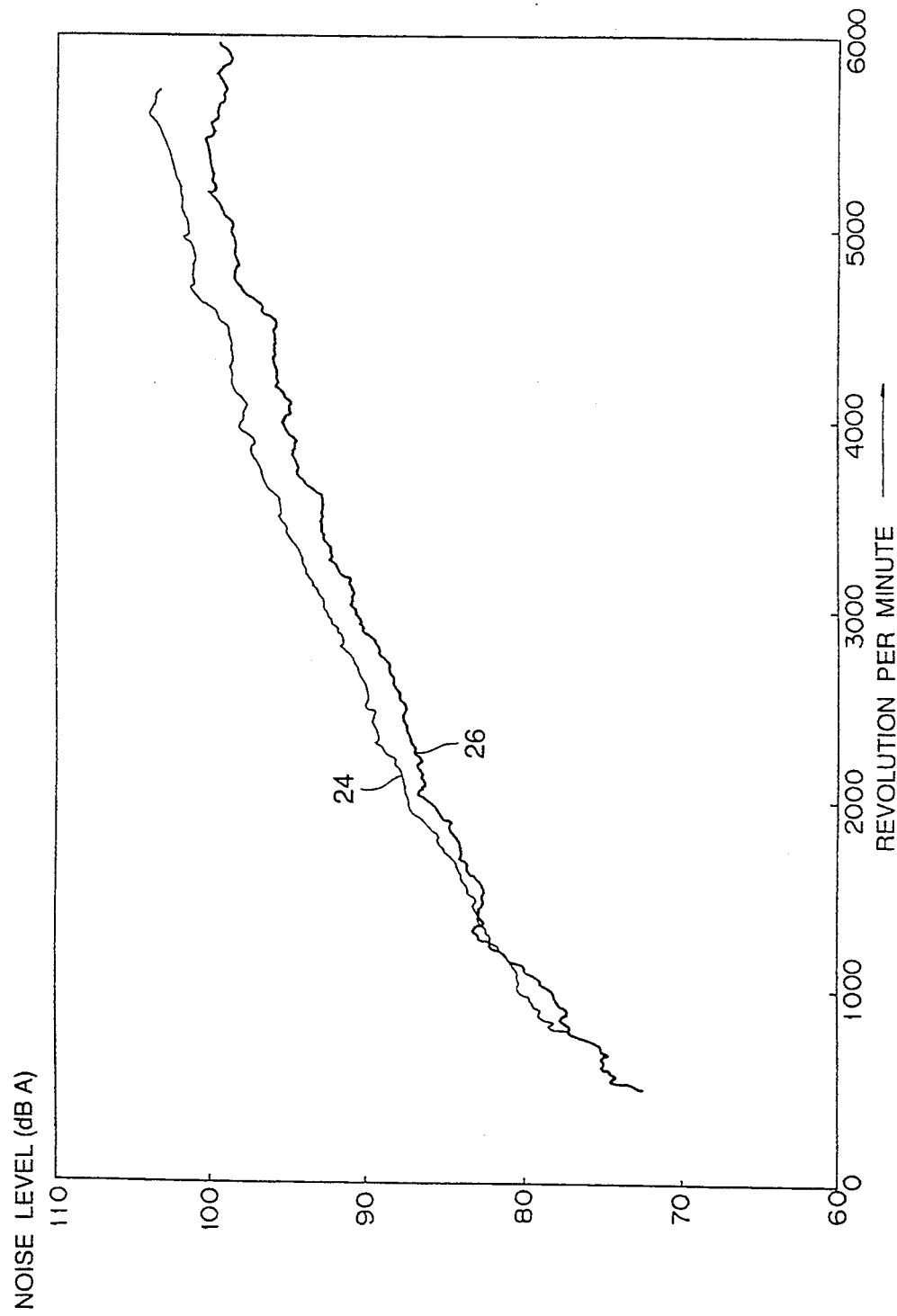
FIG. 2 is a chart showing the relative noise level of the improved sprocket versus that of a conventional sprocket.

FIG. 2 shows the noise level of the sprocket in accordance with the invention 26 versus that of a conventional sprocket 24 when each were used as the crank sprocket in a timing chain for a vehicle engine. It is evident from the test results that the improved sprocket is increasingly effective as the chain rotates faster. This decreases the overall noise level of the chain drive system.

Various modifications can be made to the apparatus described. For example, the junction between the proximal tooth surface and the bottom surfaces of the sprocket can be less pronounced and may instead form a smoother curve. This would reshape the gap between the proximal and bottom surfaces and the roller. The size and shape of the sprocket can be varied to conform to a variety of chain rollers and roller chain pitch distances. Still other modifications can be made to the invention described herein without departing from its scope as defined in the following claim.

We claim:

1. A sprocket for a roller chain having a succession of rollers, said sprocket having a plurality of teeth, with bottom surfaces located between adjacent teeth of the plurality, each tooth having a leading face and a trailing face, the trailing face of each tooth being opposite to the leading face of a next adjacent tooth, and each face having a proximal surface adjoining a bottom surface of the sprocket, and a distal surface joining the proximal surface at a meshing point and extending outwardly therefrom, wherein the meshing points on the opposed tooth faces of each pair of adjacent teeth are spaced from each other by a distance such that a circular, cylindrical chain roller in engagement with both of said meshing points is spaced from the proximal surfaces of said faces and from the adjoining bottom surface, and in which the distal surface of the trailing face of each tooth is in the form of a circular arc centered on a point at which the center of an immediately preceding chain roller is located when in contact with the meshing point on the leading face of the same tooth and the opposing meshing point of the trailing face of the tooth immediately ahead of said same tooth.

* * * * *